United States Patent [19]

Franzolini et al.

[11] Patent Number: 4,583,588
[45] Date of Patent: Apr. 22, 1986

[54] ASSEMBLY DEVICE OF FERRITIC STAINLESS STEEL TUBES ON A CARBON STEEL TUBE-PLATE, AND PROCESS OF MANUFACTURING THIS DEVICE

[75] Inventors: Marc Franzolini, Chevry II; Edmond Maria, Asnieres; Alain Vanderschaeghe, Roubaix; Jean Bezier, Croix, all of France

[73] Assignee: Stein Industrie, France

[21] Appl. No.: 628,082

[22] Filed: Jul. 5, 1984

[30] Foreign Application Priority Data

Jul. 6, 1983 [FR] France .................. 83 11261

[51] Int. Cl.⁴ ................................ F28F 9/18
[52] U.S. Cl. ..................... 165/173; 165/178
[58] Field of Search ............. 165/133, 173, 175, 178

[56] References Cited
U.S. PATENT DOCUMENTS 3,367,414  2/1968  Brown et al. .................. 165/178
3,390,250  6/1968  Apblett et al. ................. 219/125
3,440,391  4/1969  Apblett ......................... 165/173 X
4,221,263  9/1980  Meyer ............................ 165/173

Primary Examiner—Sheldon J. Richter
Attorney, Agent, or Firm—Sughrue, Mion, Zinn, Macpeak and Seas

[57] ABSTRACT

Assembly device of tubes of low carbon ferritic stainless steel having 17 to 18.5% by weight of chromium on a tube-plate of carbon steel. It includes a first overlay of low carbon austenitic stainless steel having 11.50 to 14% by weight of nickel and 22 to 25% by weight of chromium on the surface of the tube-plate opposite the plurality of tubes, a second overlay on the first of low carbon austenitic stainless steel having 10 to 12% by weight of nickel and 19 to 23% by weight of chromium extending beyond the upper level of the ends of the tubes, and weld beads with or without filling metal around these ends between these ends and the stainless steel of the second overlay.

3 Claims, 1 Drawing Figure

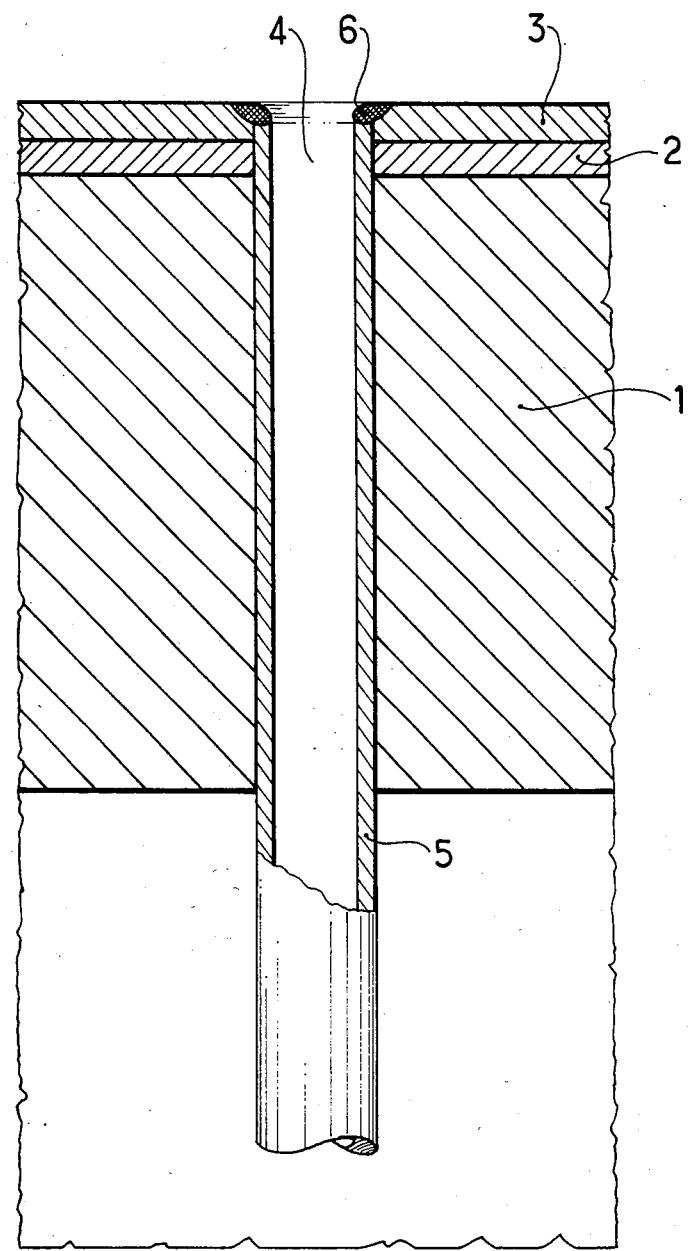

ASSEMBLY DEVICE OF FERRITIC STAINLESS STEEL TUBES ON A CARBON STEEL TUBE-PLATE, AND PROCESS OF MANUFACTURING THIS DEVICE

This invention relates to an assembly device of tubes of low carbon ferritic stainless steel having 17 to 18.5% by weight of chromium on a tube-plate of carbon steel. It also covers a process for producing such a device.

Direct welding of ferritic stainless steel to carbon steel not giving good results, it has already been proposed to produce such an assembly by previously producing on the surface of the tube-plate opposite the plurality of tubes a deposited overlay of an "Inconel" (Registered trademark of the Inco company) alloy having more than 72% by weight of nickel, 14 to 17% of chromium and 6 to 10% of iron. Such overlays are very expensive and there is a risk of cracks appearing in the joint area and in the overlay as well as in the welds, by corrosion under stress.

The purpose of this invention is to obtain an assembly device of ferritic stainless steel tubes on a carbon steel tube-plate, with the help of a overlay by fusion of an alloy that is notably less expensive than the "Inconel" alloy, giving good fluid-tightness of the weld, and greatly reducing the risks of cracking in the joint and overlay area and in the welds by corrosion under stress.

The assembly device according to the invention is characterized in that it includes a first overlay of low carbon austenitic stainless steel having 11.50 to 14% by weight of nickel and 22 to 25% by weight of chromium on the surface of the tube-plate opposite the plurality of tubes, a second overlay on the first of low carbon austenitic stainless steel having 10 to 12% by weight of nickel and 19 to 23% by weight of chromium extending beyond the upper level of the ends of the tubes, and weld beads with or without filling metal around these ends between these ends and the stainless steel of the second overlay.

By preference, the austenitic stainless steels of the of the two overlays both have a weight content of less than 0.60% of silicon, less than 2% of manganese, less than 0.025% of phosphorus, and less than 0.025% of sulfur. It will be advantageous to use an austenitic stainless steel of less than 0.025% by weight of carbon for the first overlay, and an austenitic stainless steel of less than 0.020% in weight of carbon for the second overlay.

The following description, given as an example and with reference to the single FIGURE in the appended drawing, is of an assembly of ferritic stainless steel tubes on a carbon steel tube-plate according to the invention.

The thick tube-plate (1) of non-alloyed carbon steel of grade A 48CP (weight percentages less than 0.20% carbon, less than 0.40% silicon, from 0.8 to 1.5% manganese, less than 0.04% phosphorus, less than 0.035% sulfur, less than 0.50% nickel, less than 0.25% chromium, less than 0.10% molybdenum, less than 0.05% vanadium, less than 0.04% niobium, 0.18% at most of copper) is first given by depositing by fusion (strip with flux and covered electrodes) an overlay (2) of austenitic stainless steel of the grade called 309L (less than 0.025% by weight of carbon, less than 0.60% of silicon, less than 2% of manganese, less than 0.025% of phosphorus, less than 0.025% of sulfur, from 11.5% to 14% of nickel and from 22 to 25% of chromium). It is then given by depositing (strip, flux and coated electrodes) a second overlay (3) of austenitic stainless steel of the grade called 308L (less than 0.020% by weight of carbon, less than 0.60% of silicon, less than 2% of manganese, less than 0.20% of cobalt, less than 0.025% of phosphorus, less than 0.025% of sulfur, from 10 to 12% of nickel and from 19 to 23% of chromium). Then, into the corresponding holes (4) of the tube-plate, are inserted the tubes (5), of ferritic stainless steel of grade Z2 CT18 (17 to 18.5% chromium, less than 0.03% of carbon, less than 0.5% of silicon, less than 1% of manganese, less than 0.03% of phosphorus, less than 0.01% of sulfur, less than 0.50% of nickel, less than 0.01% of molybdenum, less than 0.10% of copper, less than 0.05% of aluminum, 0.02% at most of nitrogen, with the carbon and nitrogen total at most equal to 0.04%, and a titanium content of 15 times the sum of the carbon and the nitrogen, this product having to remain less than 0.75%). The upper ends of the tubes must reach an intermediate level of the second overlay. A weld bead (6) is then produced between the end of the tube and the second overlay by means of inert gas (argon and/or helium) welding with or without filling metal.

What is claimed is:

1. Assembly device of tubes of low carbon ferritic stainless steel having 17 to 18.5% by weight of chromium on a tube-plate of carbon steel, characterized in that it includes a first overlay of low carbon austenitic stainless steel having 11.50 to 14% by weight of nickel and 22 to 25% by weight of chrome on the surface of the tube-plate opposite the plurality of tubes, a second overlay on the first of low carbon austenitic stainless steel having 10 to 12% by weight of nickel and 19 to 23% by weight of chromium extending beyond the upper level of the ends of the tubes, and weld beads with or without filling metal around these ends between these ends and the stainless steel of the second overlay.

2. Device according to claim 1, characterized in that the austenitic stainless steels of the two overlays both have a weight content of less than 0.60% of silicon, less than 2% of manganese, less than 0.025% of phosphorus, and less than 0.025% of sulfur.

3. Device according to claim 2, characterized in that the austenitic stainless steel of the first overlay has less than 0.025% by weight of carbon, and that of the second overlay has less than 0.020% by weight of carbon.

* * * * *